United States Patent [19]
Ziegler

[11] Patent Number: 5,518,434
[45] Date of Patent: May 21, 1996

[54] SNAP FIT AND TWISTABLE TOY CONSTRUCTION MODULES

[76] Inventor: James T. Ziegler, 308 St. Paul. Street, Burlington, Ontario, Canada, L7R 3J9

[21] Appl. No.: 336,086

[22] Filed: Nov. 7, 1994

[51] Int. Cl.$^6$ .................................................. A63H 33/06
[52] U.S. Cl. .......................... 446/121; 446/102; 446/106; 446/120; 403/4
[58] Field of Search .................................. 446/102, 104, 446/106, 120, 121, 124; 403/4, 360, 310, 375

[56] References Cited

U.S. PATENT DOCUMENTS

| | | | |
|---|---|---|---|
| 1,860,627 | 10/1927 | Sherman . | |
| 3,074,203 | 1/1963 | Paksy | 446/120 |
| 3,603,025 | 9/1971 | Heubl . | |
| 4,232,473 | 11/1980 | Jenkins | 446/102 |
| 4,361,979 | 12/1982 | Petersson . | |
| 4,385,459 | 5/1983 | McGrath | 446/124 |
| 4,509,929 | 4/1985 | Zawitz | 446/102 |
| 4,617,001 | 10/1986 | Parein | 446/102 |
| 4,648,738 | 3/1987 | Thielen | 403/341 |
| 4,728,310 | 3/1988 | Valtolina | 446/111 |
| 4,731,041 | 3/1988 | Ziegler | 336/115 |
| 4,738,648 | 4/1988 | Berndt | 446/120 |
| 5,110,315 | 5/1992 | Zawitz | 446/102 |
| 5,180,323 | 1/1993 | Justice | 446/120 |
| 5,282,767 | 2/1994 | Gelardi | 446/121 |

*Primary Examiner*—Robert A. Hafer
*Assistant Examiner*—Jeffrey D. Carlson

[57] ABSTRACT

A toy construction set is described having construction modules with male connectors and female connectors on selected ends thereof. Each male connector comprises a projecting pin of generally rounded cross-section with an outwardly projecting shoulder adjacent the outer end thereof. Each female connector comprises a generally square socket formed by a pair of projecting opposed L-shaped fins with one leg of each L-shaped fin being no more than one half the length of the other leg thereby providing gaps on opposite sides of a module. The fins also have grooves on inside faces thereof adapted to receive and hold in a snap fit the projecting shoulder of a male connector. With this arrangement, the modules can be simply snapped together while at the same time being rotatable relative to each other. This rotatable feature adds a new dimension to the constructions and greatly increases play value. The design of the female connector socket also simplifies the moulding of the modules because there are no undercuts.

12 Claims, 3 Drawing Sheets

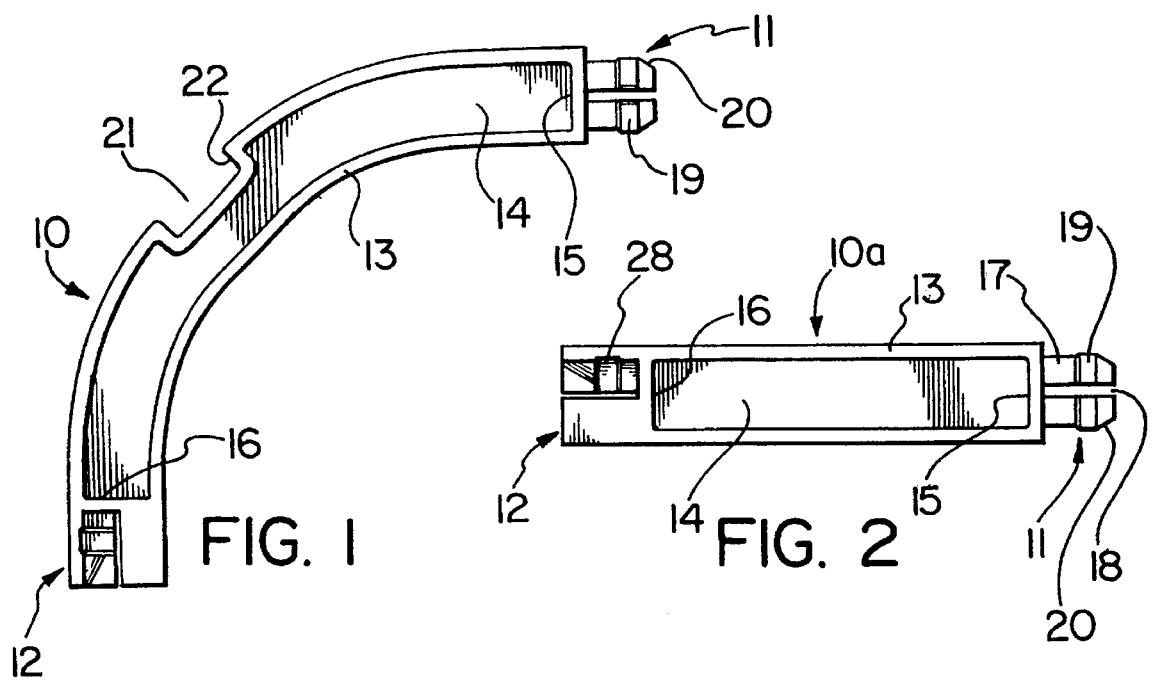
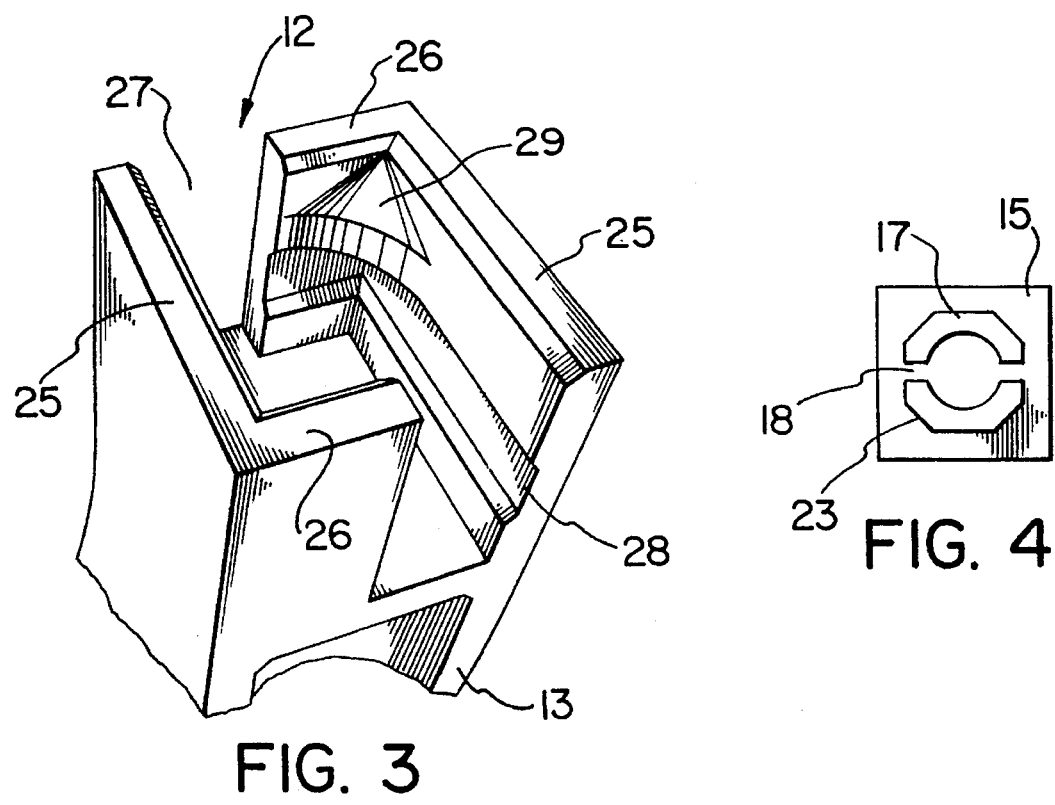

SNAP FIT AND TWISTABLE TOY CONSTRUCTION MODULES

BACKGROUND OF THE INVENTION

This invention relates to a connector arrangement for connectable plastic components and, in particular, for plastic building modules, e.g. for construction toy sets.

For many years, constructions toys have been sold in kits enabling children to make constructions of models simulating existing buildings, machines or animals or to make constructions of their imagination. As an example of such kits there may be mentioned a construction toy system known by the trade mark "ZAKS" and described in Ziegler, U.S. Pat. No. 4,731,041, issued Mar. 15, 1988. That patent describes a face-to-face connector system in the form of a circular array of radial fins on a face of a module which provide a friction fit with a like array of radial fins on another module. Other forms of friction fit connections include pins and mating holes as described in U.K. Patent 935,308, published Aug. 28, 1963.

Another construction toy with frictional engaging faces is described in Lange, U.S. Pat. No. 3,867,784, issued Feb. 25, 1975. In that design, fin-shaped frictional holding means are arranged crosswise with regard to each other with a gap between each two holding means facing each other. It has the disadvantage that when two parts are engaged in a fin to fin mode the mated parts are laterally offset to each other.

Attempts have been made to produce snap fit elements and one example of this is shown in Sherman U.S. Pat. No. 1,860,627. Here, a form of snap fastener was used requiring a special tool.

It is an object of the present invention to provide a snap fit and rotatable connector of simple design which is inexpensive to manufacture and which can be used for toys and for other connecting purposes.

SUMMARY OF THE INVENTION

This invention relates to a toy construction set comprising construction modules with male connectors and female connectors on selected ends thereof. Each male connector comprises a projecting pin of generally rounded cross-section with an outwardly projecting shoulder adjacent the outer end thereof. Each female connector comprises a generally square socket formed by a pair of projecting opposed L-shaped fins with one leg of each L-shaped fin being no more than one half the length of the other leg thereby providing gaps on opposite sides of a module. The fins also have grooves on inside faces thereof adapted to receive and hold in a snap fit the projecting shoulder of a male connector. With this arrangement, the modules can be simply snapped together while at the same time being rotatable relative to each other. This rotatable feature adds a new dimension to the constructions and greatly increases play value.

According to a preferred feature, the outer face of the male connector projecting shoulder comprises a series of flat faces, each flat face being adapted to engage the female connector groove, thereby providing a series of different fixed rotational positions between a pair of connecting modules. For instance, the male connector projecting shoulder may present eight flat face portions, thereby providing eight different fixed rotational positions between a pair of connecting modules.

According to another preferred feature of the invention, the male connector pin has an axial slot dividing the pin into two segments. This provides increased flexibility to the pin and simplifies the snapped together fit.

The modules may have many different forms. However, many of the modules in any set are of elongated configuration with the connector faces forming flat end faces of the modules. The connector faces of a single module may be parallel or they may be at an angle to each other, e.g. an angle of 60° or 90°.

The modules are typically formed in a type of I-beam configuration with wide edge walls or flanges and central web portions. The snap together and rotatable connectors of the invention are on the end flanges of each module. It is also possible to connect the modules along the edge faces in an X-configuration, e.g. by causing the edge flanges to project inwardly into the form of a socket. The edge walls of the socket taper downwardly and inwardly by about 6° and the sockets have a width to snugly receive the edge flange of another module. These sockets permit the connection of modules perpendicular to each other in an X-configuration along the sidewalls or flanges of the modules. These when used with the end connectors of the invention make possible many different special configurations.

BRIEF DESCRIPTION OF THE DRAWINGS

The invention is further illustrated with reference to the attached drawings which, by way of non-restricted examples, illustrate a variety of construction elements and some structures according to the invention.

In the drawings:

FIG. 1 is an elevation view of one construction module of the invention;

FIG. 2 is an elevation view of a further construction module;

FIG. 3 is an enlarged perspective view of a female connector;

FIG. 4 is an end elevation of a male connector;

Figure 5:
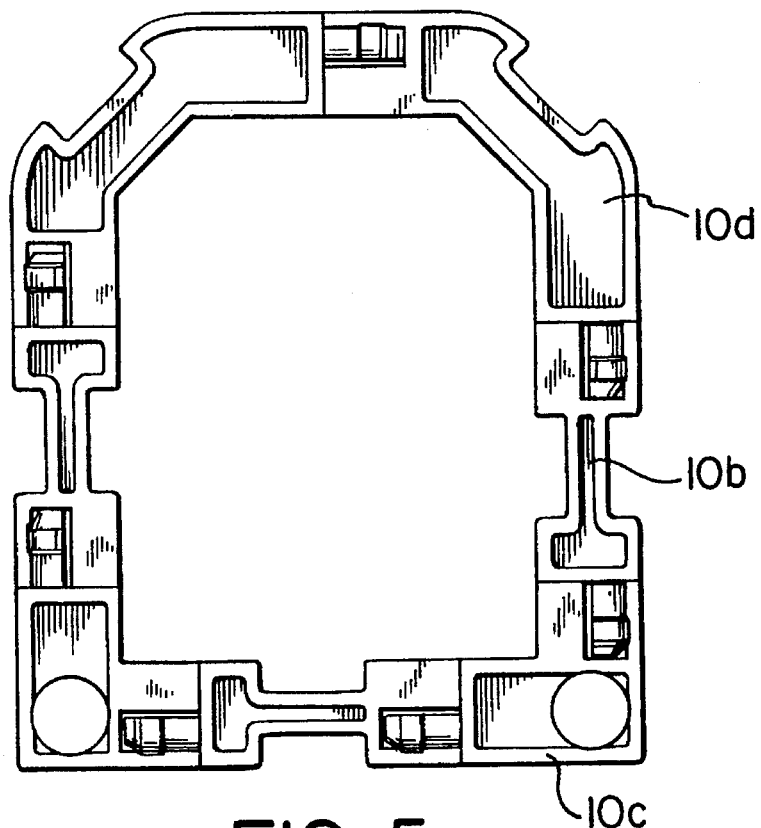
FIG. 5 is a plan view of assembled modules.

Referring now in more detail to the drawings, there is shown in FIGS. 1 and 2 a typical construction module 10 of this invention with typical male connectors 11 and female connector sockets 12 of the invention. Each module 10 has a wide and relatively thin peripheral wall or flange 13 and a central thin web portion 14 to provide rigidity. A typical module has a pair of flat end faces 15 and 16 on which the connector assemblies 11 and 12 respectively are formed. The module 10 of FIG. 1 has an elongated arcuate body with ends 15 and 16 at 90° to each other, while the module 10a in FIG. 2 has an elongated straight body.

Each male connector is in the form of a projecting pin 17 divided into two segments by means of an axial slot 18. The pin 17 also includes a raised shoulder portion 19 adjacent the outer end thereof and also preferably includes an outer tapered portion 20 to ease insertion. According to a particularly preferred embodiment of the invention, the male connector pin 17 is formed with a series of flat faces 23 as more clearly shown in FIG. 4, The female connector can be best seen from FIG. 3 and it is a socket formed primarily from two L-shaped projections, each having a long leg 25 and a short leg 26. The long leg 25 is an extension of the module flange 13, while the short leg 26 is no more than one half of the full width of the module. This leaves rectangular gaps 27 in opposite faces of the module. A rounded fillet 29 is preferably included in the inside corner between the two legs 25 and 26 of each L-shaped projection.

A slot or depression 28 is formed on the interior walls of the legs 25 and 26 and this slot receives and holds the raised shoulder 19 of the male connector pin 17. Since the slot 28 is formed in straight lines, it can be seen that the interior flat face of the slot 28 will engage the flat faces 23 of pin 17 in fixed positions. Moreover, because of the flexibility provided in pin 17 due to slot 18, after a pair of modules have been connected together, they can be rotated relative to each other into new positions. In other words, there are eight different rotational positions that can be selected for each module relative to the connected module. This provides a tremendous variety in shapes that can be created.

Figure 11:
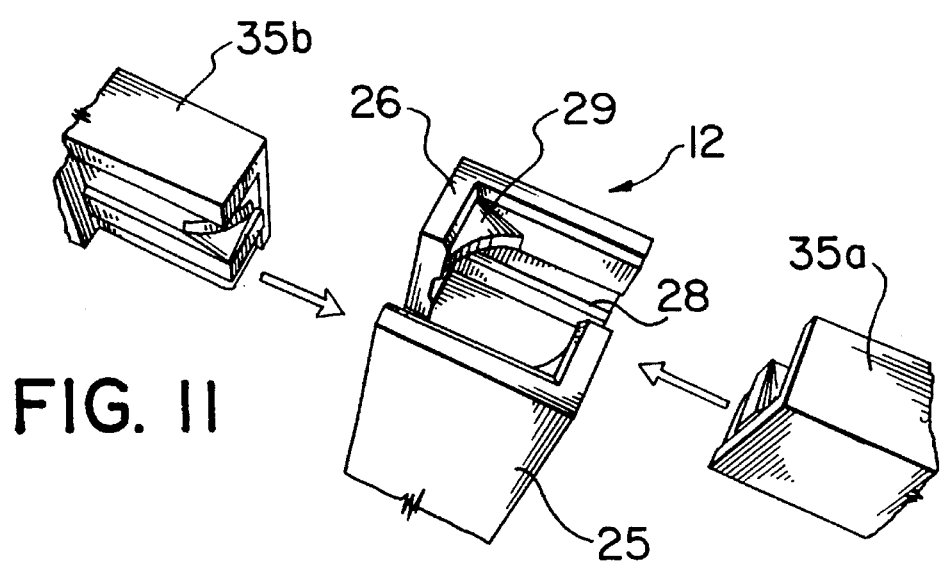
FIG. 11 is a perspective view showing a moulding assembly.

There is a further important advantage to the particular design of female connector as shown in FIG. 3. Thus, one of the problems with snap together toys is that normally grooves or recesses such as groove 28 are difficult and expensive to form on plastic moulding equipment because they are in the form of undercuts. Thus, a complex mould is normally required and this greatly increases the costs of production. However, with the particular design as shown in FIG. 3, a greatly simplified moulding system can be used as shown in FIG. 11. With this system, the two mould parts 35a and 35b are capable of forming the interior portions of the female connector socket in a single motion. The grooves 28 are designed to be formed perpendicular to the mould face and thus there are no undercuts thereby greatly simplify the moulding operation.

Figure 6:
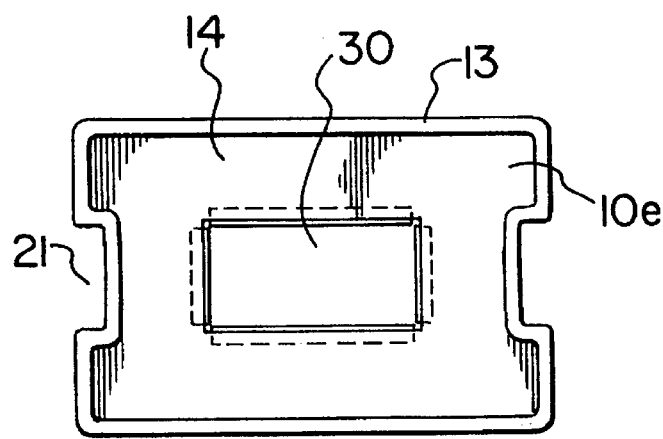
FIG. 6 is a plan view of a rectangular module with only a female connector.
Figure 7:
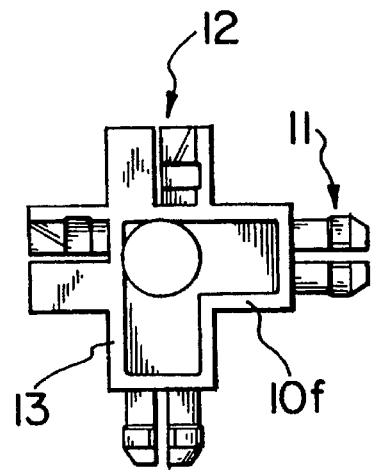
FIG. 7 is a plan view of a four point connector piece.
Figure 8:
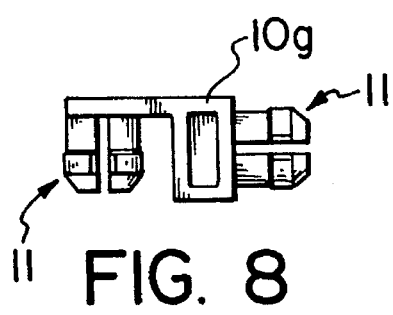
FIG. 8 is a plan view of an elbow connector with two male connectors.
Figure 9:
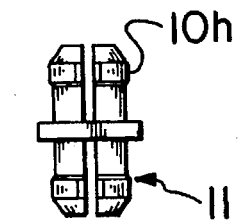
FIG. 9 is a plan view of a pin connector with two male connectors.

FIG. 5 shows a simple assembly using three different modules according to the invention. In this assembly, module 10b is a short straight connector piece, module 10c is a 90° elbow and module 10d is a 90° corner piece. FIG. 6 shows a rectangular piece 10e with a central grooved slot 30 adapted to receive a male connector. FIG. 7 is a connector piece 10f having two male connectors and two female connectors at 90°. FIG. 8 is an elbow 10g having two male connectors at 90° and FIG. 9 shows a connector pin 10h with two male connectors in a straight line connection.

Figure 10:
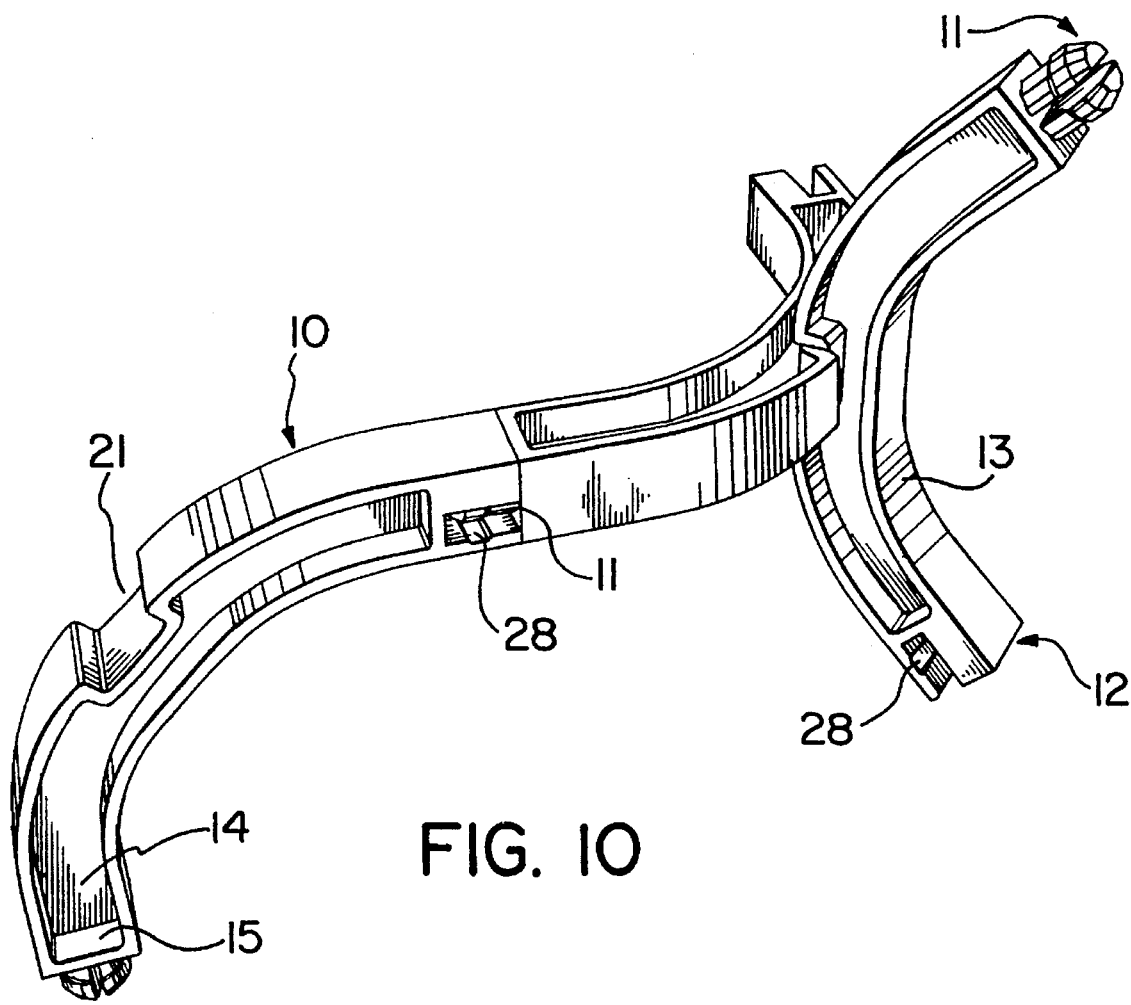
FIG. 10 is a further perspective view showing connected pieces.

Many of the modules in the drawings show a socket 21 formed in edge flange 13 with side edges 22. These side edges 22 preferably taper inwardly about 6° to hold modules together in a snap fit. Such a connection can be seen in FIG. 10 which shows modules connected both end to end and flange to flange in a perpendicular orientation.

While various changes may be made in the detail construction, it shall be understood that such changes shall be within the spirit and scope of the present invention as defined by the appended claims.

I claim:

1. A toy construction set comprising construction modules with male connectors and female connectors on selected ends thereof, each said male connector comprising a projecting pin of generally rounded cross-section with an outwardly projecting shoulder adjacent the outer end thereof, and each said female connector comprising a generally square socket formed by a pair of projecting opposed L-shaped fins with one leg of each L-shaped fin being no more than one half the length of the other leg thereby providing gaps on opposed sides of said modules and said fins having grooves on the inside faces thereof adapted to receive and hold in a snap fit the projecting shoulder of a male connector.

2. A toy construction set according to claim 1 wherein the outer face of the male connector projecting shoulder comprises a series of flat faces, each said flat face being adapted to engage a said female connector groove, thereby providing a series of different fixed rotational positions between a pair of connecting modules.

3. A toy construction set according to claim 2 wherein the male connector projecting shoulder presents eight flat face portions adapted to engage a said female connector groove, thereby providing eight different fixed rotational positions between a pair of connected modules.

4. A toy construction set according to claim 2 wherein the male connector contains an axial slot dividing the pin into two segments.

5. A toy construction set according to claim 1 wherein the inside corner of each L-shaped fin includes a rounded fillet.

6. A toy construction set according to claim 1 wherein at least one of said modules comprises an elongated body portion with end faces, with the male connector extending from one of said end faces and the female connector extending from the other of said end faces.

7. A toy construction set according to claim 6 wherein the elongated body portion has an I-beam configuration in cross-section, with edge flanges and a central web.

8. A toy construction set according to claim 7 wherein the elongated body portion is straight.

9. A toy construction set according to claim 7 wherein the elongated body portion forms a 90° corner.

10. A toy construction set according to claim 7 wherein the elongated body portion includes in an edge flange thereof a recess with side faces perpendicular to said edge flange.

11. A toy construction set according to claim 7 wherein the longer leg of each L-shaped fin is an extension of said I-beam edge flange.

12. A toy construction set according to claim 11 wherein the shorter leg of each L-shaped fin permits the formation of the female connector by a single motion of a mould core.

* * * * *